May 17, 1932.  D. W. SMITH  1,859,177

HARVESTER

Filed July 9, 1930

Inventor
Daniel W. Smith
By N. P. Daviate
Atty.

Patented May 17, 1932

1,859,177

UNITED STATES PATENT OFFICE

DANIEL W. SMITH, OF OAK PARK, ILLINOIS, ASSIGNOR TO INTERNATIONAL HARVESTER COMPANY, A CORPORATION OF NEW JERSEY

HARVESTER

Application filed July 9, 1930. Serial No. 466,770.

This invention relates to harvesters. More particularly it relates to grain binders.

Grain binders of the tractor drawn and operated type use relatively long platforms, the usual length of such platforms being 10 feet. As such long platforms are relatively difficult to support, sagging thereof, and especially at its outer end, develops, which causes objectionable whipping of the platform. It is desirable that some means be provided for supporting this platform in a manner to enable taking up of this sagging action, so that the platform cannot whip in operation of the tractor binder.

Accordingly, it is an object of this invention to provide such a construction for the platforms of grain binders to enable objectionable sagging of the platform to be taken up in an easy and convenient manner.

Such desirable object may be achieved by the illustrative example of the invention shown in the accompanying sheet of drawings, in which.

Figure 1:
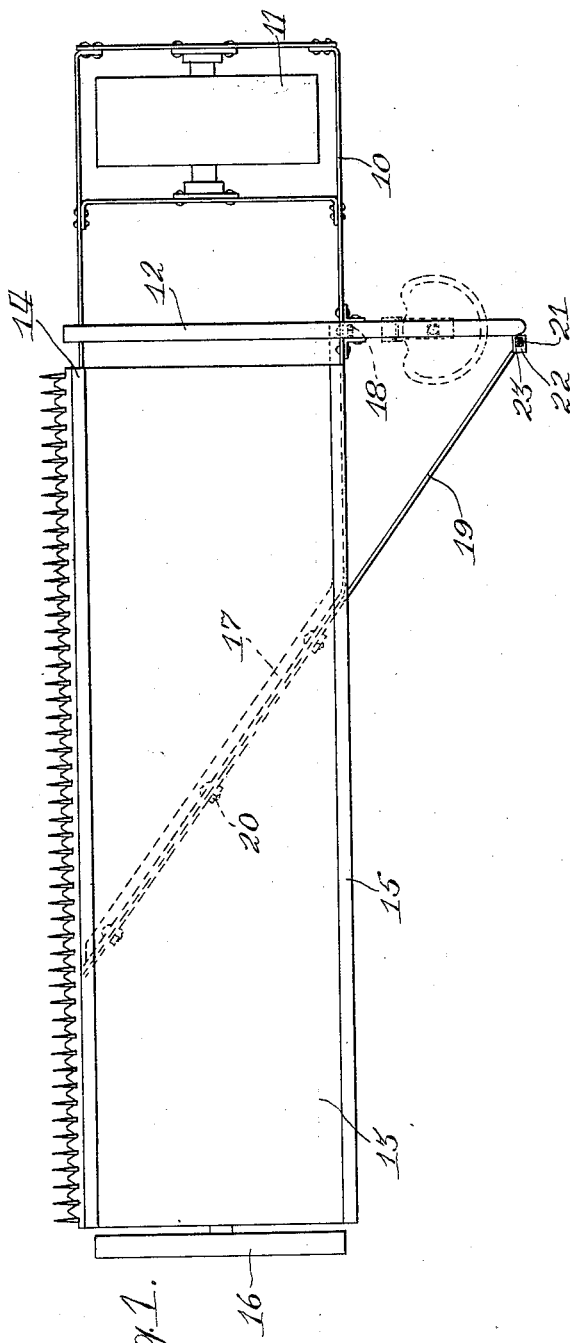
Figure 1 is a plan view of a grain binder.

The harvester comprises the usual main frame 10 carried on a main wheel 11, the frame also including the usual seat pipe frame member 12, which is longitudinally disposed on the frame and extends rearwardly thereof, as shown in Figure 1. Connected in a conventional manner to the frame 10 is a laterally extending harvester platform 13, which embodies at its front end the usual Z-bar 14 and at its rear end, the usual angle bar 15. The outer end of the harvester platform is conventionally carried on a grain wheel 16.

Figure 2:
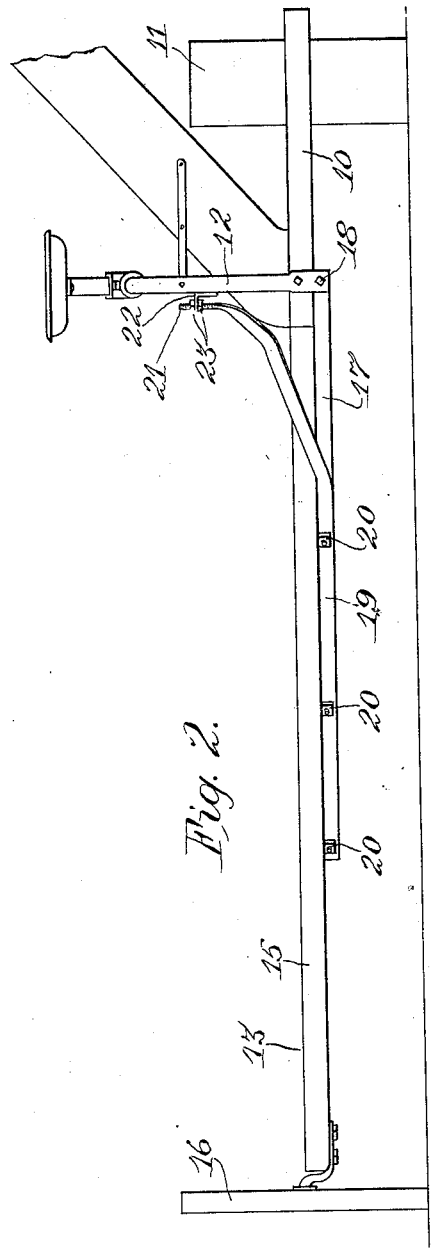
Figure 2 is a rear view of a grain binder.

These harvester platforms 13, when of unusual length as employed in tractor binders, develop a sagging action, which is objectionable in the operation of the harvester. Accordingly, the under side of the platform 13 is provided with a diagonally disposed frame member 17, which may be of angle iron and connected to an outer point of the platform 13, while the outer free end of said angle frame member 17 is bent and curved, so that the remaining length thereof will parallel the right hand end of the angle bar 15. The free end of this angle frame member 17 may be made fast by a bolt to an extension of the seat pipe 12, as appears at 18 in Figure 2. It will be noted that this frame member 17, where it is arranged underneath the platform 13 is diagonally disposed. A diagonally disposed bar 19 is next provided, which runs coextensively with the diagonal portion of the frame member 17 underneath the platform and is secured by bolts 20 to said frame member 17. The free end of the bar 19 is continued in the same diagonal direction and curved upwardly at its rear end, as appears in Figure 2, with the free end thereof finished to rod-like form and threaded as at 21. Said free end 21 is passed vertically up through a bracket 22 having a hole to receive the same, said bracket 22 being secured appropriately to the seat pipe 12. A pair of nuts 23 are provided on opposite sides of the bracket 22 and serve as a take-up and stop means so that, with the aid of a wrench, the bar 19 may be raised or lowered to spring the platform 13 in an obvious manner to take out sagging and in this fashion prevent whipping of the platform.

The use and operation of the improved structure herein described will be obvious and it will be seen that the same is simple and effective for the purpose intended.

It is the intention to cover all such changes and modifications which do not materially depart from the spirit and scope of the invention as indicated by the definitions thereof constituting the appended claims.

What is claimed is:

1. In a harvester, a frame including a seat support member, a platform connected to the frame and extending laterally thereof, a bar secured underneath the platform, said bar having an extended end carried by the seat support member, and means for taking up said end of the bar to spring the platform.

2. In a harvester, a frame including a seat support member, a platform connected to the frame and extending laterally thereof, a frame member secured underneath the platform, a bar underneath the platform and secured to the said frame member, said bar having an extended end carried by the seat support member, and means for taking up said end of the bar to spring the platform.

3. In a harvester, a frame including a seat support member, a platform connected to the frame and extending laterally thereof, said platform including a front Z-bar and a rear angle bar, a frame member secured underneath the platform and having an end curved to parallel the angle bar, said frame member having an end connected to the frame, a bar underneath the platform and secured to said frame member, said bar having an extended end carried by the seat support member, and means for taking up said end of the bar to spring the platform.

In testimony whereof I affix my signature.

DANIEL W. SMITH.